United States Patent Office.

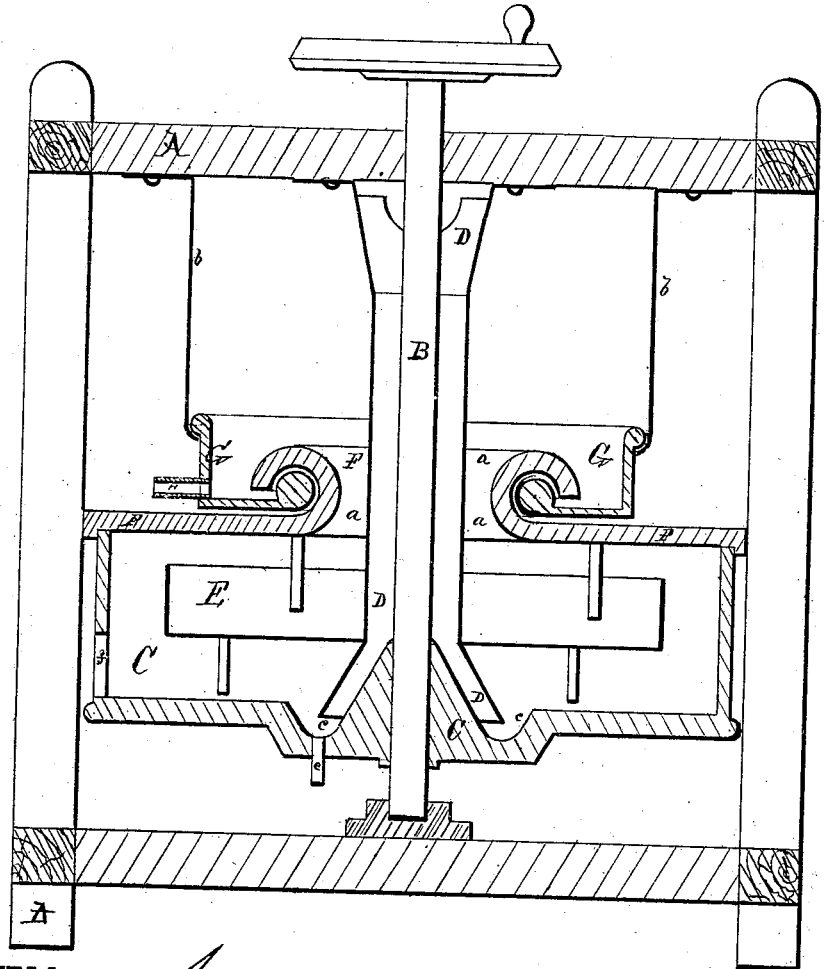

JOSEPH SCOTT, OF SAN FRANCISCO, CALIFORNIA.

Letters Patent No. 103,377, dated May 24, 1870.

IMPROVED AMALGAMATOR AND ORE-CONCENTRATOR.

The Schedule referred to in these Letters Patent and making part of the same.

*To all whom it may concern:*

Be it known that I, JOSEPH SCOTT, of the city and county of San Francisco, State of California, have invented an Improved Concentrator and Amalgamator for Ores containing the Precious Metals; and I do hereby declare that the following is a full, clear, and exact description of the same, reference being had to the accompanying drawings and to the letters marked thereon.

My invention relates to the combination of a fixed and a revolving pan, with suitable agitating, feeding, and discharging apparatus, in such a manner that the ground ores operated upon may be conducted or forced through a body of quicksilver and the metallic particles amalgamated, and the lighter or earthy particles discharged after having deposited the heavier and more valuable portions in the machine.

To enable others skilled in the art or science to which it most nearly appertains to make and use my invention, I will proceed to fully describe its construction and operation.

The accompanying drawing is a vertical section through the axis of a machine embodying my invention.

A represents the frame.

B the driving-shaft, to which is rigidly secured the revolving pan C.

D is the feeding-tube, through which the ore is supplied to the machine.

E is the fixed pan, prevented from revolving by being secured to the feeding-tube D.

F is the lid or cover to the revolving pan C, and is provided with a central circular discharge-opening, *a*, through which the lighter particles pass into the basin G, and thence off through the pipe H.

The basin G is prevented from revolving by being secured by brackets or rods *b* to the frame A.

*c* is a circular groove, recess, or depression in the bottom of the revolving pan, for containing mercury or quicksilver.

The lower end of the tube D should always be below the surface of the mercury.

The arms or rods *d* are situated at unequal distances from the axis of the machine, and are for the purpose of agitating or stirring the ore.

*e* is a plug, closing an aperture through which the quicksilver may be drawn off.

Suitable openings may be provided for removing the concentrated ore; one such opening is shown at *f*.

Power being applied to the shaft B, the pan C is caused to revolve, and the ground ore, accompanied by a stream of water, being fed into the top of the tube D, is caused to descend by the force of gravity and pass through the quicksilver, where any free gold or silver will be amalgamated and remain in the recess C, and the centrifugal force, caused by the revolution or current of the ore around the axis of the machine, will cause those particles to move out toward the circumference of the pan C, crowding those in advance up and over into the pan E and up through the circular opening *a* into the basin G, and out at the discharge-pipe H; but the ore in its passage will be continually depositing the coarser and heavier portions near the circumference of the bottom of the pan C and in the pan E, thus accomplishing the desired object by the novel and effective operation of my invention.

Having thus described my invention,

What I claim, and desire to secure by Letters Patent, is—

1. The combination of the fixed pan E and basin G with the feeding-tube D, substantially as and for the purpose specified.

2. The revolving pan C and cover F, constructed and arranged substantially as described, and for the purpose set forth.

In testimony whereof I have hereunto set my hand and seal.

JOSEPH SCOTT. [L. S.]

Witnesses:
C. W. M. SMITH,
JOHN J. MCTADDER.